US006786402B2

(12) United States Patent
Harris (10) Patent No.: US 6,786,402 B2
(45) Date of Patent: Sep. 7, 2004

(54) METHOD AND SYSTEM OF USAGE CHARGING BY PRESENTATION OF A PERSONALIZED ELECTRONIC STORAGE DEVICE AT AN ACCESS POINT TO A FACILITY

(75) Inventor: Robert Harris, Christchurch (GB)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 10/216,634

(22) Filed: Aug. 8, 2002

(65) Prior Publication Data

US 2003/0164399 A1 Sep. 4, 2003

(30) Foreign Application Priority Data

Feb. 25, 2002 (GB) ............................... 0204309

(51) Int. Cl.[7] ................................ G06K 5/00
(52) U.S. Cl. ............... 235/382; 235/382.5; 235/384
(58) Field of Search .......................... 235/375, 382, 235/382.5, 384; 705/412, 417, 418

(56) References Cited

U.S. PATENT DOCUMENTS 6,003,776 A  12/1999  Drupsteen ........... 235/492

6,609,655 B1 * 8/2003 Harrell ................ 235/380

FOREIGN PATENT DOCUMENTS

EP   1014320   6/2000

OTHER PUBLICATIONS http://www.metrosys.com.au/sharpsmart.htm "The Sharpsmart Customer Loyalty System", Metro Business Systems, 1999 pp 1–3.

* cited by examiner

*Primary Examiner*—Karl D. Frech
(74) *Attorney, Agent, or Firm*—Marilyn Smith Dawkins (57) ABSTRACT

A system and method of usage charging at any one of multiple access points to a facility involves the presentation by a user of a personalized electronic storage device, such as a smartcard, at an access point. A history of previous usage is stored on the storage device and compared at the access point with a locally stored tariff table of differential prices for different combinations of usage. An appropriate charge is then indicated to the user and, upon payment, permission to use the facility is granted and recorded in the usage history. The charge for an instance of use is variable according to the tariff table in dependence on the previous usage history.

20 Claims, 5 Drawing Sheets

METHOD AND SYSTEM OF USAGE CHARGING BY PRESENTATION OF A PERSONALIZED ELECTRONIC STORAGE DEVICE AT AN ACCESS POINT TO A FACILITY

FIELD OF THE INVENTION

The present invention relates to methods of charging for use of a facility at any of a number of access point in response to presentation of a personalised electronic storage device, such as a smart card, by a user.

BACKGROUND OF THE INVENTION

In the retail trade, the concept of discounts for frequent shoppers by way of a gift or promotional vouchers is well known. Also known is the concept of volume discounts for multiple purchases of the same goods in the course of a single shopping trip. Such schemes are normally controlled by in-store computer systems which analyse the customer's shopping history or current purchases. This is relatively efficient when the retail outlets each have a local server and database so that all data processing is within a local area network (LAN) but may be less so for the more common situation of multiple outlets or terminals having simple client processors, since much network traffic will be generated between the clients and the retailer's remote central server and databases.

Proposals have been made for reducing network traffic in geographically separate multiple terminal retail environments by the use of smart cards, on which a customer's transaction history may be stored, in local terminals which have sufficient stored information to be able to apply discounts and offer promotions. Smart cards, as is well known, comprise integrated circuitry including a processor and memory, formed on a card like substrate. External electrical contacts are provided to connect the integrated circuitry to a card reader into which the card is inserted.

One such system offered by Metro Business Systems is the Sharpsmart customer loyalty system described at http://www.metrosys.com.au/sharpsmart.htm, as updated Dec. 1, 1999. This system employs smart cards with a stored value in an electronic purse as well as the usual customer details. Points are accumulated with every purchase and stored on the card. Every time the card is read by a cash register, points are updated or converted into discounts or other offerings. Provided the cash registers are periodically updated with the various offers and rules, there is no need for real time network interaction.

Another retail system is described in European patent application 1014320 A1 for a "Method and apparatus for maintaining a customer loyalty program on a smart card". This describes a more extensive retail checkout system including scanners, printers and the like. The customer's transaction history and credit value are stored on a smart card and read by the checkout terminal which determines appropriate "customer specific retail functions", like a coupon or gift certificate, based on the history. No interaction with a store server or central database is necessary to determine the "retail function" so network traffic is reduced. In addition to the well known points approach based on the volume of purchases or total of spending, the system may offer a reward based on the number of times the customer has shopped at the retailer within a given time period.

Outside the retail environment, such as in public transport systems or entry control systems for commonly owned or controlled historic sites or leisure facilities, the use of smart cards to serve instead of tickets is well known. An example of a multiple use smart card used as a virtual ticket in a transport system is described in U.S. Pat. No. 6,003,776 (Drupsteen) entitled "Multiple Tickets on Smart Cards".

Also well known in such systems, is the concept of the season ticket. However, users frequently pay for multiple individual instances of use (e.g. journeys or visits) when they would have been better off taking the season ticket option. Although it would be possible to allow refunds or discounts retrospectively on the basis of usage history this would normally require access to a server system and central databases storing each particular user's history for computation of the most beneficial tariff and the provision over a network of an adjusted price to a point of access.

Whereas with single site access control systems this may be perfectly acceptable, with systems having multiple sites or points of access, such as electronic gates at stations or on-board ticket readers on public transport vehicles, such operations would result in an excessive amount of network traffic and possible delays in response.

SUMMARY OF THE INVENTION

Thus, the prior art does not offer a solution to the problem of retrospectively applying a differential tariff in a usage charging system. The discounting offered by retail systems is either general, based on accumulated points, or is a volume discount specific to a single occasion of purchase. Even the prior art retail systems described above, while avoiding network traffic, cannot handle a sophisticated retrospective charge adjustment based on a differential tariff such as is required by a usage charging system.

Accordingly, the present invention provides a method of usage charging at any one of multiple access points to a facility in response to presentation of a personalised electric storage device by a user at such an access point, the method comprising: recording the time and type of each instance of predetermined types of use of the facility on the storage device to form a usage history for the user; in response to presentation of the electronic storage device to a reading means, comparing, at the point of access, the stored usage history with a locally stored tariff table of differential prices for different combinations of instances of use; determining any appropriate charge according to the result of the comparison and indicating the same to the user; granting permission to use the facility, upon payment of any such required charge; and adding a further record of the time and type of use permitted to the usage history on the storage device.

Thus, the charge for an instance of use is varied in dependence on the previous usage history.

The recorded time may simply be a day or date and does not have to include a clock time.

The differential prices may reflect single and multiple instances of use within different predetermined periods of time.

The preferred type of storage device is a smart card but could be a more complex device, such as a Personal Digital Assistant (hand-held computer). The tariff table may be stored on the smart card, which uses its inbuilt processing facilities to carry out the comparison, or it may be stored in a local system, which carries out the comparison. The tariff table may be updated periodically to the local system and stored there or on the smart card. In the case where a local system carries out the processing, a simple magnetic stripe card could, in fact, be used instead of a smart card to record the usage history.

Preferably, the smart card also stores a monetary value which can be altered by the amount of any determined appropriate charge. However, the reading means may be part of a terminal which is also capable of accepting money or a credit card.

The recording step preferably records charges as part of the usage history. The appropriate charge determined by the comparison may be zero or a refund.

The permitting step may comprise issuing a ticket and/or recording the permission on the storage device or smart card.

In general, presentation of storage devices at an access point will involve physical insertion in a terminal including a reader of some sort. However, the smart card option also allows wireless communication between a transmission system such as an antenna and the card so that physical insertion is not required.

Furthermore, although the most common uses of the invention will be reduced charges for a user to take advantage of a more beneficial tariff, it could also be used to increase charges in order to deter excessive use, for example, of access to inner city areas by car.

The invention also provides a computer program which, when executed on a processor of a smart card presented at any of multiple access points to a facility, causes charging for usage of said facility by any of the above methods.

According to another aspect, the invention also provides a system of usage charging at any one of a plurality of access points to a facility comprising: a personalised electronic storage device for holding user information; a plurality of reading means at respective ones of said access points for reading such a personalised electronic storage device when presented by a user at an access point; usage recording means for recording the time and type of each instance of predetermined types of use of the facility on the storage device to form a usage history for the user; comparing means responsive to presentation of the electronic storage device to one of said reading means to compare at the point of access the stored usage history with a locally stored tariff table of differential prices for different combinations of instances of use; charging means for determining any appropriate charge according to the result of the comparison and indicating the same to the user; authorisation means for granting permission to use the facility, upon payment of any such required charge, said usage recording means being responsive to said granting of permission to add a record of the time and type of use permitted to the usage history on the storage device.

According to a further aspect, the invention also provides a smart card for use in a system of usage charging at any one of a plurality of access points to a facility, such system having a plurality of reading and recording means at respective ones of said access points for reading information from and recording information on said smart card and means for granting access to the facility, said smart card comprising: a first memory area for storing a usage history of the time and type of each instance of predetermined types of use of the facility by the smart card user; a second memory area for storing a tariff table of differential access prices for different combinations of instances of use; a third memory area for storing a monetary value; charge determination means responsive to presentation of the card to any of the system reading and recording means to compare the stored usage history with the stored tariff table to determine any appropriate charge; means for adjusting the stored monetary value appropriately; and means for recording a permission to use the facility on the card, the system being responsive to the recorded permission to grant access to the facility.

BRIEF DESCRIPTION OF THE DRAWINGS

The invention will now be described, by way of example only, with reference to preferred embodiments thereof as illustrated in the accompanying drawings, in which.

DETAILED DESCRIPTION OF THE INVENTION

A simple example of the invention is illustrated in FIGS. 1 to 4 which is applied to journey charging in a transport system, such as a railway system.

Figure 1:
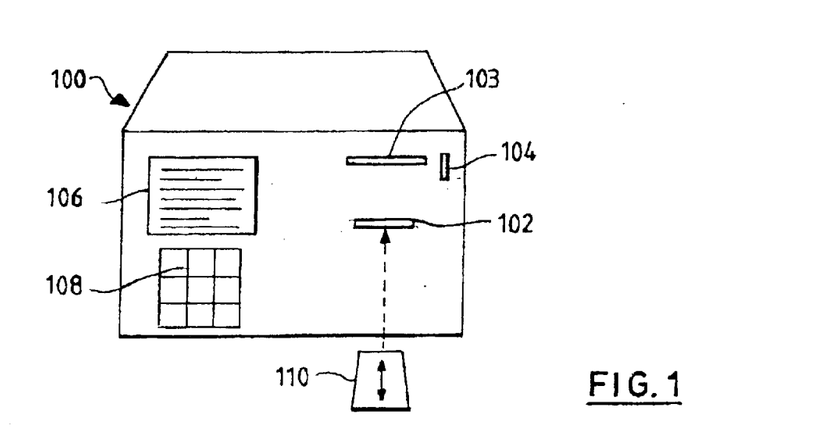
FIG. 1 shows a smart card operated ticket machine forming part of a system according to the present invention.

FIG. 1 shows a terminal 100, which is one of many located at railway stations throughout the system, and which is designed to receive a smart card 110, belonging to a passenger who wishes to travel. The terminal 100 does not issue tickets as such but, instead, records permits to travel on the smart card. The smart card is then supplied to an automatic access gate or to a ticket collector with an appropriate reader when the passenger boards the train but this aspect is not part of the present invention.

Terminal 100 has a smart card insertion slot 102 for receiving the card 110 and further slots 103, 104 for accepting payment. Whether payment is by cash or credit card and whether it is recorded on the smart card or not is not material to this embodiment of the invention.

The terminal 100 includes a display 106 for displaying journey and fare details and a keypad 108 for enabling passenger interaction with the terminal to select a desired journey.

Figure 2:
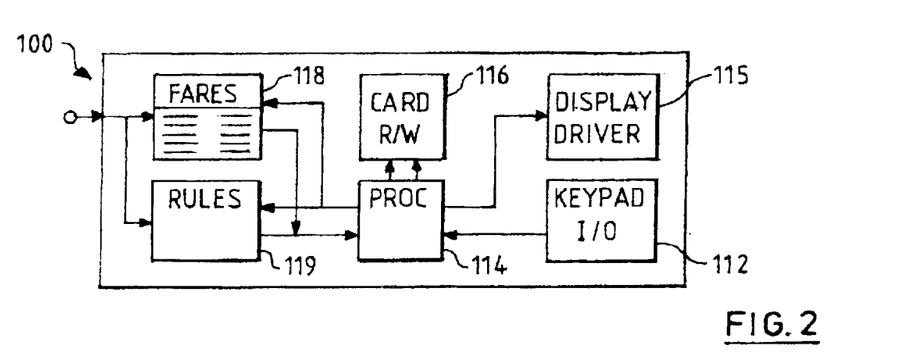
FIG. 2 shows the functional internal electronic components of the ticket machine of FIG. 1.

As shown in FIG. 2, information is received from keypad I/O circuitry 112 and processed by a terminal data processor 114 which provides output to display driver 115. A card reader 116 is able to read from and write to the smart card 110 and is in communication with the processor 114. Stored in memory within the terminal are two tables 118 and 119. Table 118 is a fare table for the journeys, including both single/return fare information and period (season) ticket information. Table 119 contains rules defining the conditions for determining the most favourable tariff for a set of journeys.

Figure 3:
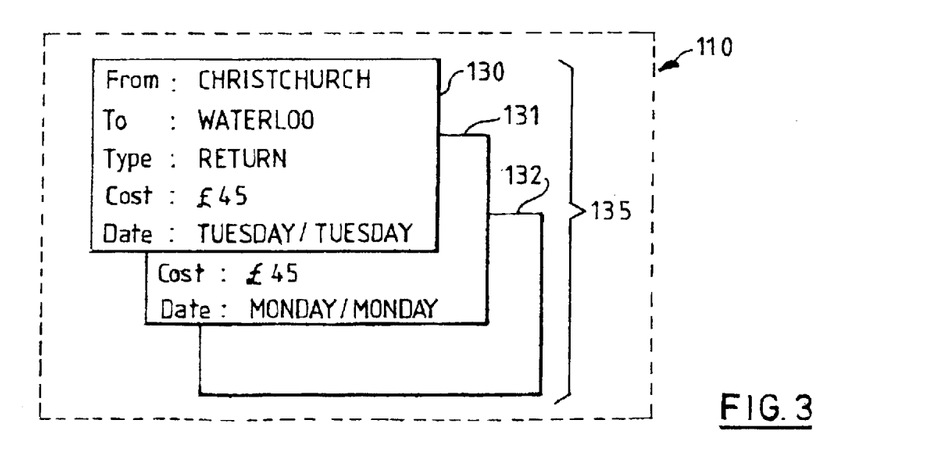
FIG. 3 illustrates how travel permit history is recorded on the smart card shown in FIG. 1.

On the smart card 110 are stored, as shown in FIG. 3, the current permit to travel 130 and a limited number of previous permits, such as 131 and 132. These collectively form a journey history 135. The permit 130 contains, as shown, departure and destination stations (Christchurch and Waterloo), type of ticket (Return), cost (£45) and dates of validity (simplified to a single day, Tuesday, for a day return). It is assumed that a similar journey was made the previous day, Monday, and the permit for Monday is retained as journey history record, 131.

The different fare tariffs stored in fares table 118 for the same journey are:

| Day return | £45 |
| 7 day period | £110 |
| 1 month period | £300 |
| Annual period | £3000 |

Figure 4:
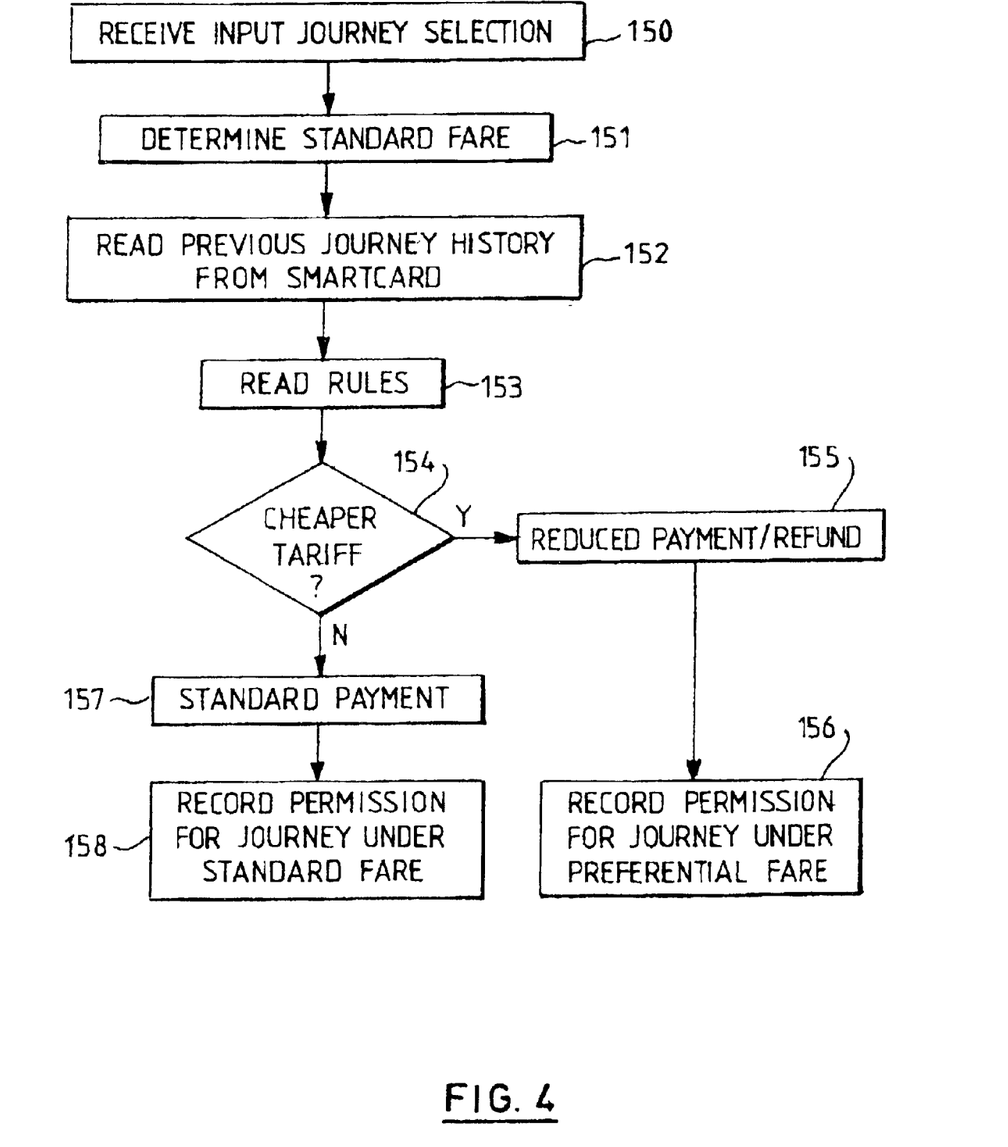
FIG. 4 is a flow diagram illustrating the operation of the system of FIGS. 1, 2 and 3 by a method according to the present invention.

One simple method of operation of the system according to the invention is illustrated in FIG. 4 and will now be considered. It is assumed that the journey history is as shown in FIG. 3 and that a further identical journey is to be made on a later day of the same week. Firstly, the passenger journey selection, input via keypad 108 and keypad I/O 112 is received, in step 150, by processor 114. In step 151, the processor determines the standard fare to be £45.

The processor next reads the journey history 135, in step 152. In step 153, the processor reads the rules 119 and compares the standard fare, in step 154, with the tariff for various period permits (effectively, season tickets). In this example, the rules 119 for the most advantageous tariff are as follows:

7 day period ticket: if 3 or more journeys within 7 days
Monthly period ticket: if 3 or more 7 day period tickets within 1 month
Annual period ticket: if 10 or more monthly period tickets within 1 year.

Thus, in the particular example chosen, it would have been cheaper for the customer to have bought a 7 day period ticket than to buy three separate return tickets. Accordingly, a reduced journey payment of £20 is calculated to bring the total to £110 and is made in step 155. The new permit is then created, at step 156, and recorded on the smart card 110, thereby adding it to the journey history 135. The new record will show the same departure and destination stations but the type will be 7 Day and the dates of validity will be MONDAY/SUNDAY.

If the rules had shown no advantage in changing to a different tariff, the standard fare would have been deducted in step 157 and a permit recorded in step 158.

The terminal 100 requires no interaction with a server in order to issue a permit to travel and to adjust the charging basis according to the best option from the stored differential tariff. For this operation, it operates in stand alone mode. The tariff information and rules, 118 and 119, are updated periodically by means of an updating compact disk without any network connection being needed. Alternatively, they may be updated periodically in batch mode over a network, which still keeps network traffic to a minimum.

A second embodiment of the invention is described in FIGS. 5 to 8. In this embodiment, it is assumed that the transport system is a bus system and that the fare structure comprises flat fares, valid for any single journey, discounted multi-trip fares and also season ticket fares, whose validity is limited by date and time. It is also assumed that the smart card can store a cash value.

Figure 5:
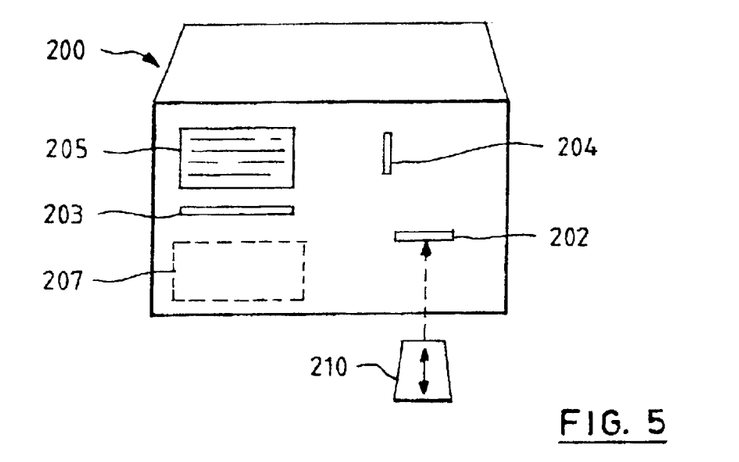
FIG. 5 is a cash adding machine used with a smart card in a further system according to the present invention.
Figure 6:
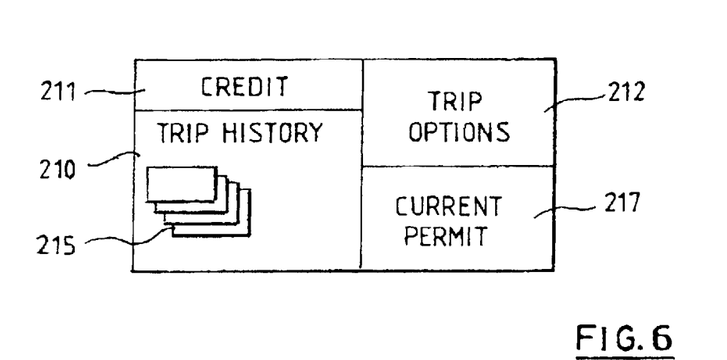
FIG. 6 illustrates how data are stored on the smart card in the further system of FIG. 5.

In FIG. 5 is shown a cash adding machine 200 for enabling monetary value to be added to a smart card 210, shown in more detail in FIG. 6. The machine 200 has a slot 202 for receiving the smart card 210. Money is added to a stored credit record 211 on the smart card by way of a banknote receiving slot 203 and a coin receiving slot 204. The amount added may be displayed on screen 205. Data processing circuitry within the machine includes a storage area 207 holding a current table of trip options and fares which can be updated asynchronously over a network from time to time or by reading it in from a separate record medium such as a compact disk. A copy of the trip options table 207 is updated and recorded in area 212 of the smart card whenever money is put on the card.

The recorded trip options table 212, in this example, has the following information recorded:

| TYPE | 1 trip | 10 trips | monthly |
| COST | £1 | £7 | £20 |
| TIME | — | — | month |

Clearly, more complex fare arrangements can be contemplated, including weekly period fares. Also, the single trip permit could be replaced by a permit limited by date and time and, in fact, allow multiple journeys within a short period of a few hours. However, for ease of explanation, only a single journey is allowed in the present case so the TIME entry is blank.

Similarly to the arrangement of FIG. 3, a file of records 215, implemented, for example, by a push down stack, forms a trip history. A separate permit record 217 contains the current or most recent permission to travel and is added to the trip history as it becomes obsolete and is replaced.

The current permit and individual trip history records have the same format in this example, which is as follows:

| SINGLE TRIP | FLAG | DATE |
| MULTI TRIP | FLAG | DATE N of M |
| SEASON | FLAG | {DATE} to {DATE} |

The flag field is set to indicate which type of permit is used for the trip. For multi-journey permits, which are equivalent to M single trip permits, the current number N which has been used is recorded. The date of issue is recorded for both single and multi journey permits. For the season permit, the start and end dates of the period of validity are recorded.

Figure 7:
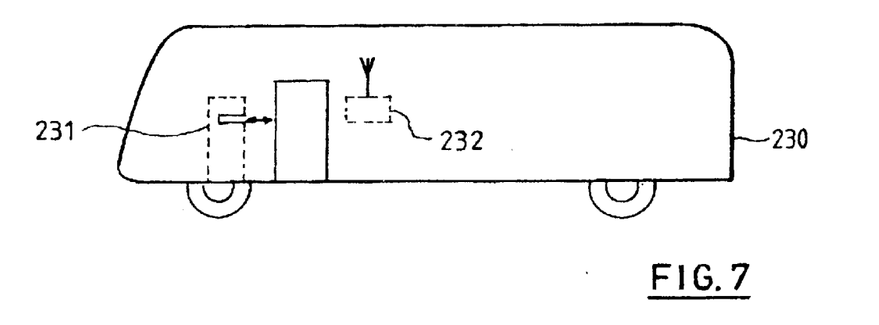
FIG. 7 schematically illustrates a bus able to interact with the smart card of FIG. 6 in the further system according to the present invention.

The third element of the system, as shown in FIG. 7 is a sensor in the bus 230. One form of sensor is a pillar mounted reader 231 in which the smart card must be inserted on boarding the vehicle. An alternative type of sensor 232, which can operate in wireless mode, may be used, depending on the smart card technology employed. It is of course not likely that both types will be used in the same system and they are shown as alternatives.

The operation of the system of FIGS. 5 to 7 as the passenger boards the bus will now be described in conjunction with the flow diagram of FIG. 8. Firstly, the card details are read, in step 250, by the sensor on the bus which is aware of the current date and time. It is then determined, in step 252, whether the season ticket option is flagged in the current permit 217 and is valid for the current date. If it is, then travel is permitted (step 290). If it is not, then, in step 254, the permit is checked for a valid multi journey flag with remaining trips available. If there is at least one trip still available on a multi-journey permit, then the number of trips remaining on the permit is decremented by one and the date of the current journey recorded, in step 256. The previous record is stored in the trip history 215 and travel is permitted.

If neither a season ticket nor a multi journey permit is valid, then the system will proceed to charge for the next trip according to the most favourable tariff, based on the passenger's usage history. By examining the trip history record 215, in step 258, the system determines the number C of trips taken since the last multi journey flag, the last season ticket flag or since the start of the history, if neither flag is found. If C is equal to T, the number of trips at which a multi journey permit becomes the cheaper option, as determined in step 260, then it would be more advantageous to the passenger to have paid the multi trip fare than another single fare. In step 262, flags in the previous T trip history records are changed to multi journey flags. In step 264, the current permit is changed to multi journey. Assuming this operation takes place as soon as C reaches the value T, which is 7 in this example, no payment or refund is necessary but the following three trips will be free and validated by step 254. However, in general, the price of a multi trip permit need not be an integral multiple of the single trip fare or an overpayment may have been made, so step 266 reflects the possibility of a refund being made to the credit value 211 on smart card 210.

Before the next trip is authorised, a check is made, in steps 268 and 270, to see if the total usage has reached the level where a season ticket would be more advantageous. By examining the trip history, a count N1 is made of the total number of trips made and a count N2 is made of the number of days since the last season ticket expired or since the start of the history. If N1 equals a number J and if less than D days have expired (step 270), the current permit is changed to season in step 272 and the previous N1 history flags are changed to Season in step 274. This should happen at the point when the total paid equals or would exceed the value of a season permit (equivalent to J=26 in this example, representing two multi-trip charges and a further six single trip charges). If, as in this example, the cost is equal (£20), no value adjustment should be necessary. Otherwise, a refund to the smart card credit value 211 is made in step 276. In either case, further trips may then be made until the expiry of the season permit.

If the season ticket amount has not been reached, then the multi journey permit created in step 264 is used and updated in step 278 after which travel is permitted.

Similarly, if at step 260, it is determined that a payment sufficient for a multi journey trip had not yet been accumulated, a single trip payment would be taken from the credit 211 on the smart card and a permit recorded for a single trip, in step 280.

Figure 8:
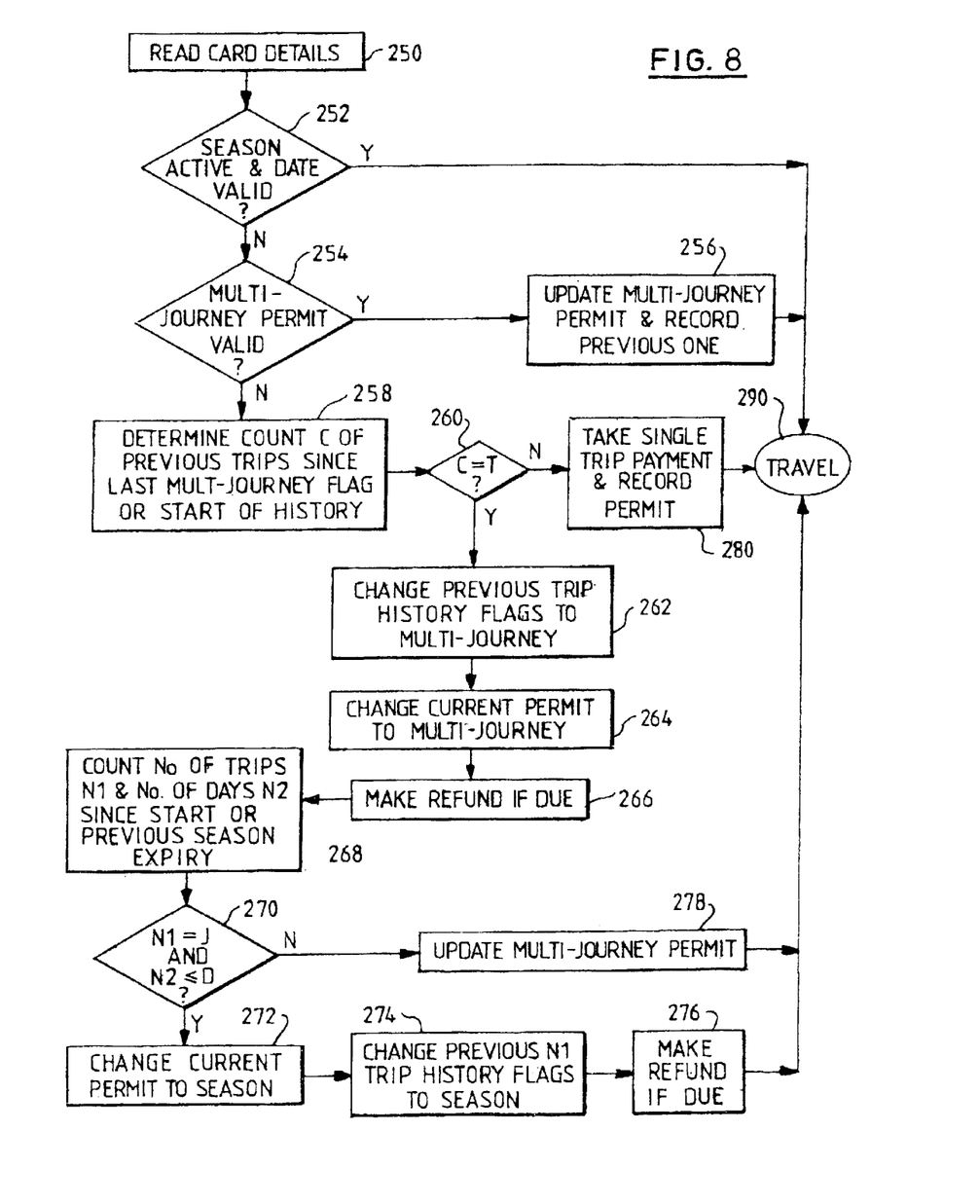
FIG. 8 is a flow diagram illustrating the operation of the system of FIGS. 5, 6 and 7 by a method according to the present invention.

In the above example, all the processing steps of FIG. 8 are carried out on the smart card, using its built-in processor. However, it would also be possible for some of the processing to be carried out, without requiring any network interaction, in the on-board reader 231.

Figure 9:
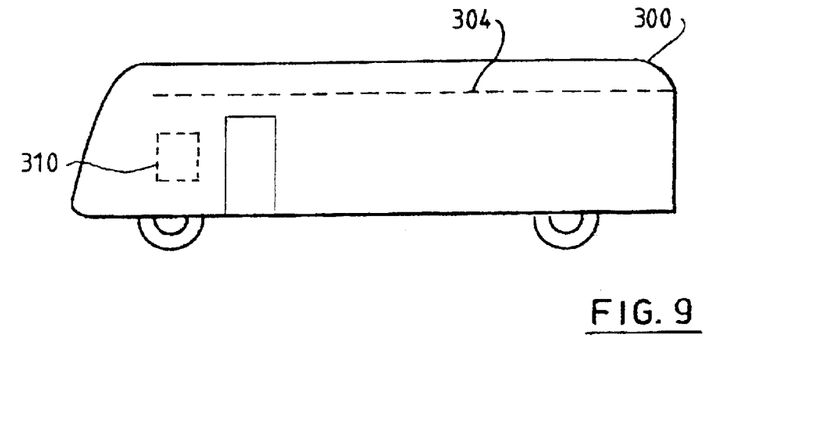
FIG. 9 shows a bus, designed to use a smart card charging system in accordance with a third embodiment of the present invention.
Figure 10:
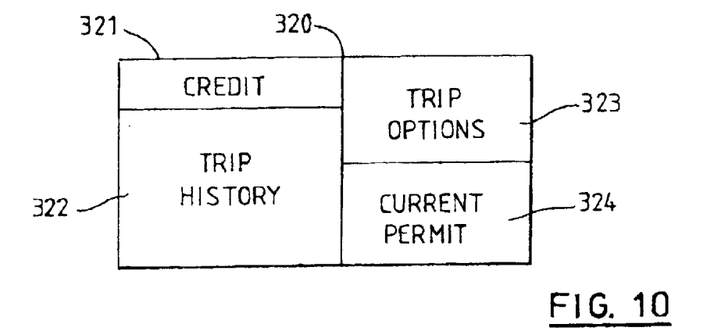
FIG. 10 shows the layout of data on a smart card employed in the third embodiment of the invention.
Figure 11:
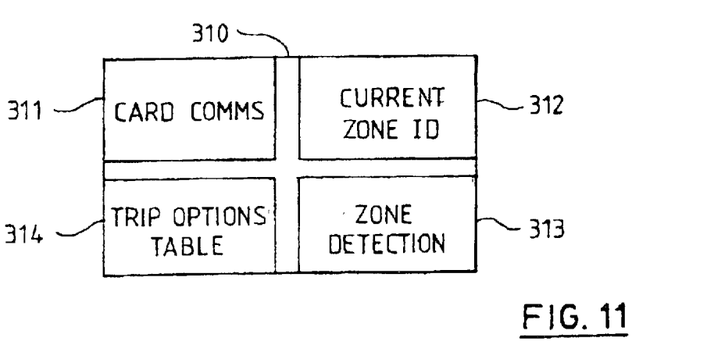
FIG. 11 illustrates schematically data held by a zone controller employed in the third embodiment of the invention.

A final example of the invention is illustrated in FIGS. 9, 10 and 11. In this example, a zonal based charging system is assumed. This means that a given trip does not have a single, fixed charge but varies with the distance travelled, in steps, as zone boundaries are crossed. It is assumed that the charge for crossing each zone boundary is the same but there is also a system entry charge equivalent to an additional boundary crossing. In order to work in a bus transport system, zone boundaries have to be communicated to the smart card as they are crossed. This can be achieved with a suitable network of radio transmitters positioned at the necessary zone boundaries on major routes and detectors on the bus. Alternatively, zone boundaries could be input manually by the driver.

The bus 300 shown in FIG. 9 includes such an on-board zone detector and controller 310, which sends information to smart cards 320 (FIG. 10) via a wireless on-board transmission system 304. The memory on the smart card 320 is arranged substantially similarly to that of FIG. 6. Thus it has a credit value region 321, a trip history 322, a trip options table 323 and a current permit 324.

As well as suitable card communications circuitry 311 and zone detector circuitry 313, the relevant portions of the controller 310, as shown in FIG. 10, are a current zone identifier record 312 and a source trip options table 314. This table, in the present example, will typically contain the following information:

| TYPE | SINGLE ZONE | MULTI ZONE | DAY-ALL ZONES | SEASON |
|------|-------------|------------|---------------|--------|
| COST | £1 | £15 | £5 | £30 |
| TIME | — | — | DAY | MONTH |

The trip options table 314 is used to update the copy 323 in the smart card, via the transmission system 304, whenever the passenger boards the bus at the start of a journey.

The trip history 322 contains, for each zone of travel, a record of DATE/TIME; ZONE ID; and a FLAG which may be set to the type of permit, namely: single zone, multi-zone, day travel or season. As before, the trip history may be implemented as a push-down list.

In operation, when the passenger gets on the bus 300, the smart card 320 is detected and communicates with the zone controller 310 via the communications circuitry 311 and transmission mechanism 304. This communication triggers a handshake from the smart card to the zone controller, causing it to update the trip options table 323 in the smart card and create two entries in the trip history table 322, with the current zone ID (two entries are created to reflect the entry charge and the cost of the first zone of travel). If, after the comparison process to be described below, there is no more favourable fare, the credit value 321 on the smart card is reduced by twice the single zone charge, £2.

When a new zone is crossed, input on this is detected or supplied to the zone controller which updates the current zone ID 312 and transmits this over transmission network 304 to the smart cards on the bus. Again, if no more favourable rate applies, this causes the credit value 321 on the smart card to be reduced by the cost of a single zone, £1, and the trip history 322 to be updated.

Before either of these two charges is made, the smart card processor determines if a different type of permit would reduce the total cost. It does this by firstly checking whether an all day permit could be used, followed by a check on whether a multi-journey permit would be even better and finally a season permit.

The algorithm is as follows:
START
Assume the number of zones which make it worthwhile to change to an All Zone 1 day permit is Z.
Assume the number of single trip records (N.B. this number counts a system entry as a single zone trip) which make it worthwhile to change to a Multi trip permit is T.

Assume that the number of trip records which will make it worthwhile to change to a season ticket is J in D days.
IF ((a Season is active) AND (today is within the date scope)) do nothing—the permit is already adequate;
Examine the trip history 322 for the current day and count the number of trips, N;
  When N=0, set the permit 324 to single and deduct single zone charge from credit value 321;
  When (N≧0) AND (N<Z), set the permit 324 to single and deduct single zone charge from credit value 321;
  When N=Z, set permit 324 to All Zones/Day; Refund any excess cash to credit 321;
  Update trip flags for current day to All Zones/Day;
  END
Count number of zonal trips C (single zone only, not multi zone, All Day or Season);
  IF C=T, THEN:
  Change current permit 324 to Multi-Zone;
  Refund value to credit record 321 as necessary;
  Change the last T flags in trip history 322 to Multi-Zone;
  END
Count the number of trips N1 in the trip history taken since the last Season permit flag and the number of days N2;
  IF (N1=J) AND (N2 <=D) THEN:
  Change current permit 324 to Season;
  Refund value to credit record 321 as necessary;
  Change the last N1 flags to Season;
  END
END

What is claimed is:

1. In a multiple access point facility having a plurality of reading means at respective ones of said access points for reading a personalized electronic storage device when presented by a user at an access point, a method of usage charging comprising the steps of:
  recording the time and type of each instance of predetermined types of use of the facility on the storage device to form a usage history for the user;
  in response to presentation of the electronic storage device to a reading means, comparing at the point of access the stored usage history with a locally stored tariff table of differential prices for different combinations of instances of use including single and multiple instances of use within different predetermined periods of time;
  determining any appropriate charge according to the result of the comparison and indicating the same to the user;
  granting permission to use the facility, upon payment of any such required charge; and
  adding a further record of the time and type of use permitted to the usage history on the storage device.

2. A computer program comprising instructions which, when executed on a processor of a smart card presented at any of multiple access points to a faciilty, causes charging for usage of said facility by a method as claimed in claim 1.

3. A method as claimed in claim 1 in which the storage device is a smart card and the reading means is part of a local data processing system at the access point, the tariff table being stored in said local system, said comparing step being carried out by the local system.

4. A method as claimed in claim 3 in which said smart card also stores a monetary value, further including the step of altering the stored monetary value by the amount of any determined appropriate charge.

5. A method as claimed in claim 1 in which the storage device is a smart card on which said tariff table is stored, said comparing step being carried out by said smart card.

6. A method as claimed in claim 1 in which the appropriate charge determined according to the result of the comparison may be zero or a refund.

7. A method as claimed in claim 1 in which said permission granting step comprises issuing a ticket.

8. A method as claimed in claim 1 in which said permission granting step comprises recording permission on said storage device.

9. A method as claimed in claim 1 in which said usage history is recorded as a list of past permissions.

10. A method as claimed in claim 1 where the facility is a transport system and said tariff table includes the prices for single journeys, multiple journeys and season permits.

11. A system of usage charging at any one of a plurality of access points to a facility comprising:
  a personalised electronic storage device for holding user information;
  a plurality of reading means at respective ones of said access points for reading such a personalised electronic storage device when presented by a user at an access point;
  usage recording means for recording the time and type of each instance of predetermined types of use of the facility on the storage device to form a usage history for the user;
  comparing means responsive to presentation of the electronic storage device to one of said reading means to compare at the point of access the stored usage history with a locally stored tariff table of differential prices for different combinations of instances of use including single and multiple instances of use within different predetermined periods of time;
  charging means for determining any appropriate charge according to the result of the comparison and indicating the same to the user;
  authorisation means for granting permission to use the facility, upon payment of any such required charge, said usage recording means being responsive to said granting of permission to add a record of the time and type of use permitted to the usage history on the storage device.

12. A system as claimed in claim 11 in which the storage device is a smart card and the reading means are part of a local data processing system at the access point, the tariff table being stored in said local system, said comparing means being part of the local data processing system.

13. A system as claimed in claim 11 in which the storage device is a smart card on which said tariff table is stored, said comparing means being located on said smart card.

14. A system as claimed in claim 12 in which said smart card also stores a monetary value, the system further including means for altering the stored monetary value by the amount of any determined appropriate charge.

15. A system as claimed in claim 14 in which said usage recording means is adapted to record past permissions to form said usage history.

16. A system as claimed in claim 14 in which the appropriate charge determined according to the result of the comparison may be zero or a refund.

17. A system as claimed in claim 11 in which said authorisation means is adapted to issue a ticket.

18. A system as claimed in claim 11 in which said authorisation means is adapted to record permission for use on said storage device.

19. A system as claimed in claim 11 where the facility is a transport system and said tariff table includes the prices for single journeys, multiple journeys and season permits.

20. A smart card for use in a system of usage charging at any one of a plurality of access points to a facility, such system having a plurality of reading and recording means at respective ones of said access points for reading information from and recording information on said smart card and means for granting access to the facility, said smart card comprising:

a first memory area for storing a usage history of the time and type of each instance of predetermined types of use of the facility by the smart card user;

a second memory area for storing a tariff table of differential access prices for different combinations of instances of use including single and multiple instances of use within different predetermined periods of time;

a third memory area for storing a monetary value;

charge determination means responsive to presentation of the card to any of the system reading and recording means to compare the stored usage history with the stored tariff table to determine any appropriate charge;

means for adjusting the stored monetary value appropriately; and means for recording a permission to use the facility on the card, the system being responsive to the recorded permission to grant access to the facility.

* * * * *